(12) United States Patent
Holverson et al.

(10) Patent No.: US 9,669,484 B2
(45) Date of Patent: Jun. 6, 2017

(54) SYSTEMS AND METHODS FOR DETECTING WELDING AND CUTTING PARAMETERS

(71) Applicant: Illinois Tool Works Inc., Glenview, IL (US)

(72) Inventors: Todd Earl Holverson, Appleton, WI (US); Nathan Gerald Leiteritz, Greenville, WI (US); Jeffery P. Schroeder, Shanghai (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1062 days.

(21) Appl. No.: 13/770,769

(22) Filed: Feb. 19, 2013

(65) Prior Publication Data

US 2013/0277345 A1 Oct. 24, 2013

Related U.S. Application Data

(60) Provisional application No. 61/636,014, filed on Apr. 20, 2012, provisional application No. 61/636,292, filed on Apr. 20, 2012.

(51) Int. Cl.
*B23K 9/095* (2006.01)
*H01R 9/05* (2006.01)

(52) U.S. Cl.
CPC .......... *B23K 9/0956* (2013.01); *B23K 9/0953* (2013.01); *H01R 9/0503* (2013.01)

(58) Field of Classification Search
CPC .... B23K 9/0953; B23K 9/0956; B23K 9/013; B23K 9/0135; B23K 10/006; B23K 9/095;

(Continued)

(56) References Cited

U.S. PATENT DOCUMENTS 4,266,114 A  5/1981 Hansen
6,066,832 A * 5/2000 Uecker ................. B23K 9/095
                                              219/130.31

(Continued)

FOREIGN PATENT DOCUMENTS

CN       1082474      2/1994
JP     2007229734    9/2007

OTHER PUBLICATIONS

International Search Report from PCT application No. PCT/US2013/036720 dated Aug. 16, 2013, 12 pgs.

(Continued)

*Primary Examiner* — Geoffrey S Evans
(74) *Attorney, Agent, or Firm* — Fletcher Yoder P.C.

(57) ABSTRACT

A system for detecting welding, and cutting parameters is provided. One embodiment of the system includes an input terminal configured to receive signals corresponding to welding or cutting parameters from a first welding or cutting device. None of the signals carry welding power. The system also includes an output terminal configured to provide the signals to a second welding or cutting device. The system includes conductors coupled between the input terminal and the output terminal and configured to carry the signals between the input terminal and the output terminal. The system also includes control circuitry configured to detect the welding or cutting parameters from the signals.

20 Claims, 4 Drawing Sheets

(58) Field of Classification Search
CPC ............ B23K 9/10; G05B 2219/45138; G05B 2219/45068; G05B 2219/45135; H01R 9/0503; H05H 1/36
See application file for complete search history.

(56) References Cited

U.S. PATENT DOCUMENTS

| | | | |
|---|---|---|---|
| 6,242,711 | B1 | 6/2001 | Cooper |
| 6,583,386 | B1 | 6/2003 | Ivkovich |
| 6,670,579 | B2* | 12/2003 | Davidson ............ B23K 9/1062 219/125.1 |
| 2004/0089645 | A1* | 5/2004 | Saccon ................. B23K 9/091 219/130.21 |
| 2004/0162630 | A1* | 8/2004 | Hillen .................. G05B 19/042 700/212 |
| 2004/0173591 | A1 | 9/2004 | Knoener |
| 2005/0016975 | A1 | 1/2005 | Reynolds |
| 2006/0168128 | A1 | 7/2006 | Sistla |
| 2006/0207980 | A1* | 9/2006 | Jacovetty ............ B23K 9/1062 219/130.5 |
| 2007/0068910 | A1 | 3/2007 | Ikeda |
| 2007/0080149 | A1 | 4/2007 | Albrecht |
| 2007/0145019 | A1 | 6/2007 | Picard |
| 2007/0145027 | A1 | 6/2007 | Izawa |
| 2008/0023457 | A1* | 1/2008 | Holverson ........... B23K 9/0282 219/130.1 |
| 2008/0061049 | A1 | 3/2008 | Albrecht |
| 2008/0082196 | A1* | 4/2008 | Wiese ................. G05B 19/4184 700/110 |
| 2008/0149602 | A1* | 6/2008 | Lenzner ............... B23K 9/1068 219/121.45 |
| 2009/0173726 | A1* | 7/2009 | Davidson ............. B23K 9/0956 219/130.01 |
| 2009/0313549 | A1* | 12/2009 | Casner ................. B23K 9/0953 715/740 |
| 2010/0108654 | A1* | 5/2010 | Ulrich .................. B23K 9/0953 219/130.5 |
| 2010/0224610 | A1 | 9/2010 | Wallace |
| 2012/0085741 | A1 | 4/2012 | Holverson et al. |

OTHER PUBLICATIONS http://www.impactwelding.com (Feb. 19, 2013).
Computer Weld Technology, Inc. (Feb. 19, 2013).
Lincoln Arc Tracker Data Monitor (Feb. 8, 2013).
Lincoln True Energy (Feb. 19, 2013).
http://www.millerwelds.com/resources/articles/Axcess-E-with-Insight-Delivers (Feb. 19, 2013).
http://www.ametinc.com/controllers.htm (Feb. 19, 2013).
http://www.procellution.com/software/procell/overview.html (Feb. 19, 2013).
Lincoln Electric—Arc Tracker Operator's Manual (Sep. 2011).
Communication Pursuant to Article 94(3) EPC for EP Patent Application No. 13718753.0 dated Apr. 18, 2017, 5 pgs.

* cited by examiner

SYSTEMS AND METHODS FOR DETECTING WELDING AND CUTTING PARAMETERS

CROSS REFERENCE TO RELATED APPLICATION

This application claims the benefit of U.S. Provisional Patent Application No. 61/636,014, entitled "Systems and Methods for Detecting Welding Parameters", filed on Apr. 20, 2012, and U.S. Provisional Patent Application No. 61/636,292, entitled "Systems and Methods for Detecting Welding Parameters", filed on Apr. 20, 2012, which are hereby incorporated by reference in their entirety.

BACKGROUND

The invention relates generally to welding and cutting systems and, more particularly, to systems and methods for detecting welding parameters in welding and cutting systems.

Welding and cutting processes have increasingly become utilized in various industries and applications. Welding and cutting processes may include, but are not limited to, processes such as: gas metal arc welding (GMAW), shielded metal arc welding (SMAW), flux cored arc welding (FCAW/FCAW-S), submerged arc welding (SAW), gas tungsten arc welding (TIG), carbon arc gouging (CAW), plasma arc welding (PAW), and plasma cutting. Such processes may be automated in certain contexts, although a large number of applications continue to exist for manual welding operations. In both cases, such operations rely on a variety of types of equipment to ensure the supply of consumables (e.g., wire feed, shielding gas, etc.) is provided to the operation in appropriate amounts at the desired time.

In various industries, it may be desirable to monitor selected welding or cutting parameters from welding or cutting applications. Such welding or cutting parameters may provide operators, supervisors, and/or managers with information that may be used to improve welding or cutting applications, to improve efficiency for future welding or cutting applications, and/or to train welding or cutting operators for improving welding or cutting quality. However, in certain welding or cutting systems, welding or cutting parameters may be used and/or transferred within the welding or cutting system but may be unavailable for monitoring and analysis by devices outside the welding or cutting system. For example, certain low cost welding systems may not include hardware and/or software configured to detect welding parameters produced during a welding application. Accordingly, there exists a need in the field for low cost devices that enable welding or cutting parameters produced in welding or cutting systems to be detected and to be available to devices outside the welding or cutting system.

BRIEF DESCRIPTION

In one embodiment, a system for detecting welding or cutting parameters includes an input terminal configured to receive signals corresponding to welding or cutting parameters from a first welding or cutting device. None of the signals carry welding power. The system also includes an output terminal configured to provide the signals to a second welding or cutting device. The system includes conductors coupled between the input terminal and the output terminal and configured to carry the signals between the input terminal and the output terminal. The system also includes control circuitry configured to detect the welding or cutting parameters from the signals.

In another embodiment, a method for detecting welding or cutting parameters includes receiving, at a welding or cutting monitoring device, signals from first welding or cutting device. The signals correspond to welding or cutting parameters and none of the signals carry welding power. The method also includes detecting, at the welding or cutting monitoring device, welding or cutting parameters from the received signals. The method includes providing the received signals to a second welding or cutting device.

In another embodiment, a device for detecting welding or cutting parameters includes a first connector and a second connector. The device also includes conductors coupled between the first connector and the second connector. Each conductor is configured to carry a signal between the first connector and the second connector. None of the conductors carry welding power. The device includes control circuitry configured to detect welding or cutting parameters from the conductors.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
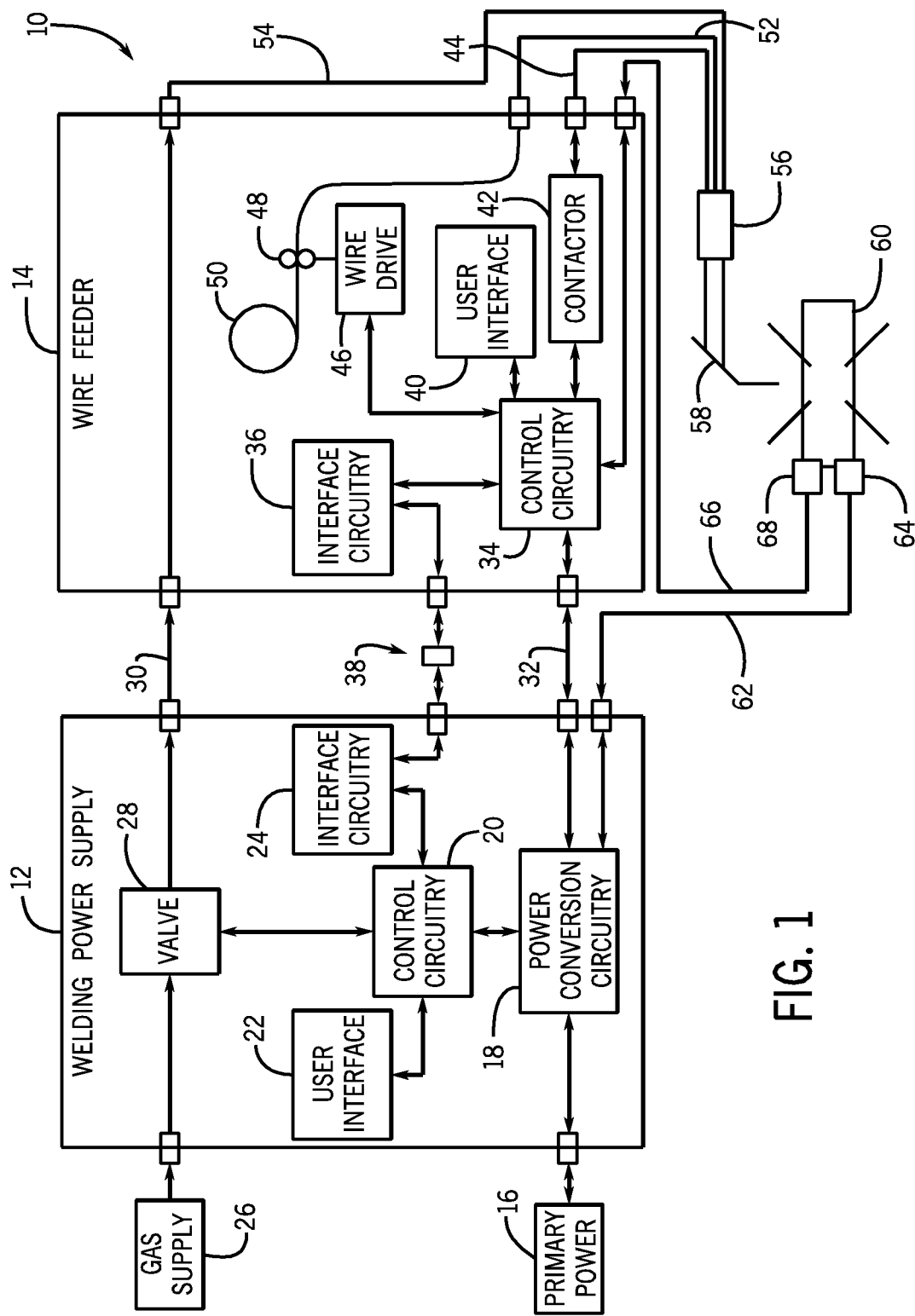
FIG. 1 is a block diagram of an embodiment of a welding system employing a low cost monitoring system for detecting welding parameters in accordance with aspects of the present disclosure.

Turning now to the drawings, FIG. 1 is a block diagram of an embodiment of a welding system 10 with a low cost monitoring system for detecting welding parameters. In the illustrated embodiment, the welding system 10 is a gas metal arc welding (GMAW) system, sometimes referred to by its subtypes metal inert gas (MIG) welding or metal active gas (MAG) welding, although the present techniques may be used in other welding systems, such as flux cored arc welding (FCAW), shielded metal arc welding (SMAW), gas tungsten arc welding (GTAW), tungsten inert gas (TIG), and so forth. The welding system 10 powers, controls, and supplies consumables to a welding application. The welding system 10 includes a welding power supply 12 and a wire feeder 14. Certain welding systems 10 (e.g., TIG) may not include the wire feeder 14, but may include a foot and/or hand controller for controlling the welding application.

The welding power supply 12 receives primary power 16 (e.g., from the AC power grid, an engine/generator set, a battery, or other energy generating or storage devices, or a combination thereof), conditions the primary power 16, and provides an output power to one or more welding devices in accordance with demands of the system 10. The primary power 16 may be supplied from an offsite location (i.e., the primary power may originate from the power grid). Accordingly, the welding power supply 12 includes power conversion circuitry 18 that may include circuit elements such as transformers, rectifiers, switches, and so forth, capable of converting the AC input power to AC or DC output power as dictated by the demands of the system 10 (e.g., particular welding processes and regimes).

In some embodiments, the power conversion circuitry 18 may be configured to convert the primary power 16 to both weld and auxiliary power outputs. However, in other embodiments, the power conversion circuitry 18 may be adapted to convert the primary power 16 only to a welding power output, and a separate auxiliary converter may be provided to convert the primary power 16 to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply welding and auxiliary power.

The welding power supply 12 includes control circuitry 20. The control circuitry 20 includes at least one controller that controls the operations of the welding power supply 12, and may be configured to receive and process a plurality of inputs regarding the performance and demands of the system 10. Furthermore, the control circuitry 20 may include volatile or non-volatile memory, such as ROM, RAM, magnetic storage memory, optical storage memory, or a combination thereof. In addition, a variety of control regimes for various welding processes, along with associated settings and parameters may be stored in the memory along with code configured to provide a specific output (e.g., initiate wire feed, enable gas flow, etc.) during operation.

The welding power supply 12 may include a user interface 22. The control circuitry 20 may receive input from the user interface 22 through which a user may choose a process, and input desired parameters (e.g., voltages, currents, particular pulsed or non-pulsed welding regimes, and so forth). Furthermore, the control circuitry 20 may control parameters input by the user as well as any other parameters. Specifically, the user interface 22 may include a display for presenting, or indicating, information to an operator. The control circuitry 20 uses interface circuitry 24 for communicating data to other devices in the system 10, such as the wire feeder 14. The communicated data may include various welding parameters.

A gas supply 26 provides shielding gases, such as argon, helium, carbon dioxide, and so forth, depending upon the particular welding application. The shielding gas may be filtered by a filter assembly before flowing to a valve 28. The valve 28 controls the flow of gas, and if desired, may be selected to allow for modulating or regulating the amount of gas supplied to a welding operation. The valve 28 may be opened, closed, or otherwise operated by the control circuitry 20 to enable, inhibit, or control gas flow through the valve 28. For example, when the valve 28 is closed, shielding gas may be inhibited from flowing through the valve 28. Conversely, when the valve 28 is opened, shielding gas is enabled to flow through the valve 28. Shielding gas exits the valve 28 and flows through a cable or hose 30 (which in some implementations may be packaged with the welding power output) to the wire feeder 14 which provides the shielding gas to the welding operation. In some embodiments, the valve 28 may be in the wire feeder 14, or in any suitable device, such as a device closer to the welding arc than the welding power supply 12.

Welding power flows through a cable 32 to the wire feeder 14. As will be appreciated, the term "welding power" refers to the power that creates an arc formed during a welding application. It should be noted that monitoring "welding power" directly may necessitate expensive components (e.g., current sensing transducers, raw arc voltage sensing components, etc.) to handle the currents and/or voltages that correspond to the "welding power." Accordingly, the low cost embodiments described herein are not designed to monitor "welding power" in order to keep the cost of the monitoring equipment low.

In certain embodiments, the wire feeder 14 may use the welding power for auxiliary power) to power the various components in the wire feeder 14, such as to power control circuitry 34. The control circuitry 34 controls the operations of the wire feeder 14. The wire feeder 14 also includes interface circuitry 36 for communicating with the welding power supply 12. As described in detail below, a low cost monitoring system 38 may be used to detect welding parameters being transferred between the welding power supply 12 and the wire feeder 14. Although primarily described herein as being used to detect welding parameters being transferred between the welding power supply 12 and the wire feeder 14, as will be appreciated, the monitoring system 38 may be used to detect welding parameters being transferred between any two devices in a welding system. For example, in a TIG system, the monitoring system 38 may be used to detect welding parameters being transferred between a welding power supply and a remote foot and/or hand control.

The wire feeder 14 includes a user interface 40. The control circuitry 34 may receive input from the user interface 40, such as via methods and devices described in relation to the user interface 22. Furthermore, the control circuitry 34 may display information to an operator, such as voltage, current, wire speed, wire type, and so forth. A contactor 42 (e.g., high amperage relay) is controlled by the control circuitry 34 and configured to enable or inhibit welding power to flow to a weld power cable 44 for the welding operation. In certain embodiments, the contactor 42 may be an electromechanical device, while in other embodiments the contactor 42 may be any other suitable device, such as a solid state device. In some embodiments, the contactor 42 may be located in the power supply 12. The wire feeder 14 includes a wire drive 46 that receives control signals from the control circuit 34 to drive rollers 48 that rotate to pull wire off a wire spool 50. The wire is provided to the welding operation through a cable 52. Likewise, the wire feeder 14 may provide shielding gas through a cable 54. As may be appreciated, the cables 44, 52, and 54 may be bundled together with a coupling device 56 (e.g., coaxial cable).

A torch 58 uses the wire, welding power, and shielding gas for a welding operation. Further, the torch 58 is used to establish a welding arc between the torch 58 and a workpiece 60. A work cable 62, which may be terminated with a clamp 64 (or another power connecting device), couples the welding power supply 12 to the workpiece 60 to complete a welding power circuit. As illustrated, a voltage sense cable 66 may be coupled from the wire feeder 14 to the workpiece 60 using a sense clamp 68 (or another power connecting mechanism). The wire feeder 14 is connected to the welding power supply 12 so that it may operate even when a welding arc is not formed by the torch 58. Specifically, the wire feeder 14 receives welding power from the welding power supply 12 through the cable 32. The welding power is connected to the various components in the wire feeder 14 (e.g., control circuitry 34, wire drive 46, user interface 40, interface circuitry 36). A return path for the wire feeder 14 power is formed using the sense cable 66 with the sense clamp 68 connected to the workpiece 60. Further, the work cable 62 with the work clamp 64 provide the final portion of the return path to the welding power supply 12. Thus, the return path includes the cable 66, the workpiece 60, and the cable 62. In certain embodiments, non-welding power for the wire feeder 14 components (e.g., control circuitry 34, user interface 40, wire drive 36, wire spool 50, and so forth) may be supplied from an auxiliary power source such as 24 VDC from the welding power supply 12 via a control cable.

Figure 2:
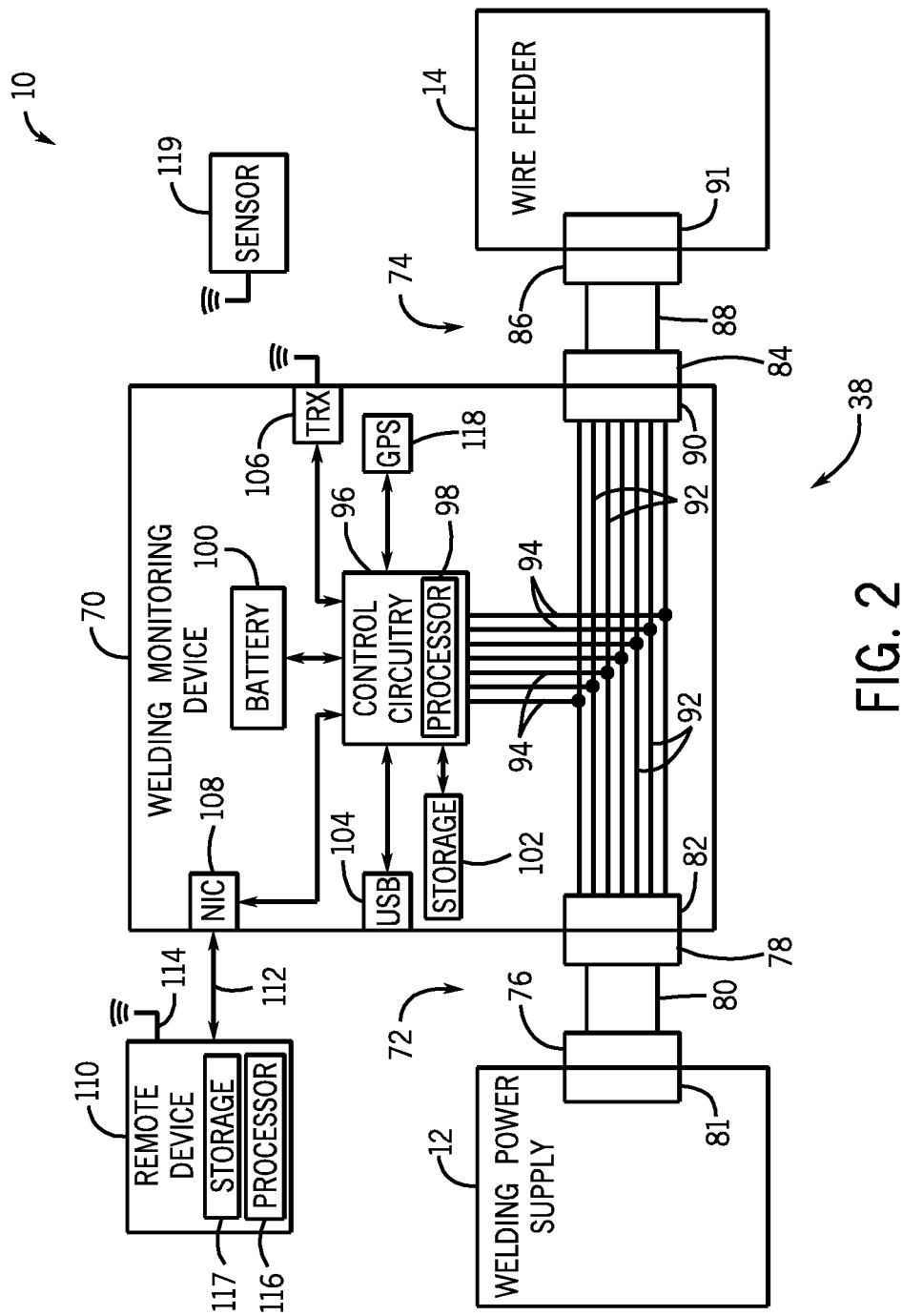
FIG. 2 is a block diagram of an embodiment of a low cost monitoring system for detecting welding parameters employing a welding monitoring device in accordance with aspects of the present disclosure.

FIG. 2 is a block diagram of an embodiment of the low cost monitoring system 38 for detecting welding parameters employing a welding monitoring device 70. The monitoring system 38 also includes a first cable assembly 72 and a second cable assembly 74. In the present embodiment, the first cable assembly 72 is coupled between the welding power supply 12 and the welding monitoring device 70. As illustrated, the first cable assembly 72 includes a first connector 76 coupled to the welding power supply 12 and a second connector 78 coupled to the welding monitoring device 70. The first cable assembly 72 also includes a cable 80 having conductors that carry signals between the first connector 76 and the second connector 78. The first connector 76 couples with a connector 81 of the welding power supply 12. The second connector 78 couples with a first connector 82 of the welding monitoring device 70. As will be appreciated, in certain embodiments, the cable 80 may extend directly into the welding monitoring device 70 and eliminate the need for the connectors 78 and 82. In such a configuration, the first cable assembly 72 may be integrated with (e.g., partially integrated into) the welding monitoring device 70.

The second cable assembly 74 includes a first connector 84 coupled to the welding monitoring device 70 and a second connector 86 coupled to the wire feeder 14. The second cable assembly 74 also includes a cable 88 having conductors that carry signals between the first connector 84 and the second connector 86. The first connector 84 couples with a second connector 90 of the welding monitoring device 70. The second connector 86 couples with a connector 91 of the wire feeder 16. As will be appreciated, in certain embodiments, the cable 88 may extend directly into the welding monitoring device 70 and eliminate the need for the connectors 84 and 90. In such a configuration, the second cable assembly 74 may be integrated with (e.g., partially integrated into) the welding monitoring device 70. It should be noted that in certain applications, the connectors 76, 78, 81, 82, 84, 86, 90, and/or 91 may be 14-pin connectors configured to include up to 14 pins or sockets, such as connectors used on a "14-pin" cable used to couple a welding power supply 12 to a wire feeder 14. Furthermore, the connectors 76, 78, 81, 82, 84, 86, 90, and 91 and/or the pins or sockets within such connectors may be considered input and/or output terminals which may provide (e.g., transmit, pass through, etc.) and/or receive at least one of signals or non-welding power.

The welding monitoring device 70 includes conductors 92 coupled between the first connector 82 and the second connector 90. The conductors 92 carry signals between the first connector 82 and the second connector 90. Accordingly, the monitoring system 38 includes conductors extending between the welding power supply 12 and the wire feeder 14 to carry signals between the welding power supply 12 and the wire feeder 14. As illustrated, conductors 94 are coupled to the conductors 92 to allow control circuitry 96 to detect welding parameters carried by the conductors 92. Using the conductors 94, the welding monitoring device 70 may act as a "sniffer" of signals transmitted between the welding power supply 12 and the wire feeder 14. As such, it should be noted that the signals carried on the conductors 92 between the welding power supply 12 and the wire feeder 14 are able to be monitored and remain generally unaltered. Furthermore, the signals carried on the conductors 92 are not welding power. In certain embodiments, the welding monitoring device 70 is configured to modify (e.g., issue a command, interrupt, adjust) the signals carried on the conductors 92 (e.g., based on detected welding parameters or sensor data). It should be noted that the cables 80 and 88 are part of the monitoring system 38 and are completely separate from the cables 30 and 32.

As described herein, the welding monitoring device 70 is designed to be low cost by having limited functionality (e.g., the welding monitoring device 70 may only detect, process, and provide (e.g., transmit) welding parameters, or the welding monitoring device 70 may only detect, process, store, and provide (e.g., transmit) welding parameters). Specifically, the control circuitry 96 is used to detect welding parameters carried by the conductors 92. For example, the control circuitry 96 may be used to detect analog signals carried by the conductors 92 such as signals relating to the contactor 42, voltage feedback, current feedback, remote command signals, sensors, and so forth. In certain embodiments, the analog signals may be filtered and scaled 0 to 10 VDC signals. As another example, the control circuitry 96 may be used to detect digital signals carried by the conductors 92 such as digital signals transferred using various communication protocols (e.g., RS-485, RS-232, Ethernet, DeviceNet, ArcLink™, etc.). In certain embodiments, the control circuitry 96 may be configured to request information from a welding device (e.g., welding power supply 10, wire feeder 12, robot device, control device, remote user interface, programmable logic controller (PLC), etc.) using the digital signals carried by the conductors 92. As such, the control circuitry 96 may be able to access data, that would otherwise be unavailable to the control circuitry 96. As will be appreciated, the control circuitry 96 or another device may derive information from the welding parameters by analyzing the welding parameters. Such analysis may provide the following data: average voltages, average current, amount of time the welding system 10 has been operating, amount of time to perform a welding application, quality issues related to a welding application, total power used, spatter events, spatter quantity, wire feed speed, a welding process being used (e.g., MIG, Accupulse™, Regulated Metal Deposition (RMD™), etc.), a welding wire type, a welding wire diameter, a shielding gas type, machine error codes, and so forth.

The control circuitry 96 may include at least one controller or processor 98 that controls the operations of the control circuitry 96. Accordingly, the processor 98 may include one or more microprocessors, such as one or more "general-purpose" microprocessors, one or more special-purpose microprocessors and/or ASICS, or some combination thereof. For example, the processor 98 may include one or more reduced instruction set (RISC) processors or digital signal processors (DSPs). In certain embodiments, the control circuitry 96 may be powered (e.g., by a low voltage power such as 12 to 24 VDC) by the conductors 94, by a power outlet (e.g., using a wall wart), or by another power source. It is again noted that when control circuitry 96 is powered by the conductors 94, operating power not welding power) is provided to the control circuitry 96. In other embodiments, such as the illustrated embodiment, the control circuitry 96 may be powered by a battery 100 disposed within the welding monitoring device 70.

In certain embodiments, the control circuitry 96 may detect welding parameters and store them in a storage device 102. The storage device 102 (e.g., nonvolatile storage) may include ROLL flash memory, a hard drive, or any other suitable optical, magnetic, or solid-state storage medium, or a combination thereof. The control circuitry 96 may also be coupled to a universal serial bus (USB) port 104 through which welding parameters may be transferred, received, and/or stored. The control circuitry 96 may also be configured to communicate wirelessly (e.g., using a transceiver 106) or via a wired connection (e.g., using a communication port such as a network interface card (NIC) 108). The wireless communication may use any suitable communication technology or protocol (e.g., Wi-Fi, Bluetooth, ZigBee, cellular, etc.). In certain embodiments, the control circuitry 96 may be configured to send welding parameters to a remote device 110 (e.g., server, workstation, computer, portable electronic device, etc.) using the wired or wireless communication. Furthermore, the control circuitry 96 may be programmed and/or setup by receiving communication from the remote device 110. As will be appreciated, in certain embodiments, the remote device 110 may be on a common network (e.g., Internet, intranet, "cloud," etc.) with the welding monitoring device 70, and may be directly coupled to the welding monitoring device 70 via a network cable 112. In addition, in certain embodiments, the remote device 110 may be configured to communicate with the welding monitoring device 70 wirelessly through a wireless transceiver 114.

In certain embodiments, the remote device 110 may include one or more processors 116 and one or more storage devices 117. As such, the remote device 110 may be configured to receive welding parameters, store welding parameters, analyze welding parameters (e.g., extract data from, calculate data based on, etc.), allow access to the welding parameters and analyzed data, and so forth. Accordingly, data stored on the remote device 110 may be accessed by support personnel to troubleshoot issues involved with a welding application.

In certain embodiments, the control circuitry 96 may be coupled to a geospatial locating device, such as a GPS device 118, for determining the location of the welding monitoring device 70. Furthermore, the control circuitry 96 may include an internal clock to timestamp data so that welding parameters may correlate with a time of day. Together, the combined welding parameters and time of day may be used to correlate a welding application to a welding operator, a work order, a job number, a part number, a shift, a fixture, a sensor 119, other tools, and so forth. In certain embodiments, the internal clock may be synchronized with a remote device to enable alignment between data (e.g., event data) detected at the welding monitoring device 70 and data of the remote device. In certain systems, an internal clock of a second welding monitoring device may also be synchronized with the remote device so that multiple welding monitoring devices have clocks that are synchronized with the remote device. As illustrated, the welding system 10 may include the sensor 119 or more than one sensor 119. The sensor 119 may be any type of sensor that gathers data. For example, the sensor 119 may be a bar code reader, a welding operator badge, a biological sensor, an REID tag, pressure sensor, flow sensor, electrical contact sensor, presence sensor (e.g., weight activation mat, light curtain, proximity switch, proximity sensor), and so forth. The sensor 119 may communicate with the welding monitoring device 70 wirelessly or via a wired connection. The welding monitoring device 70 may be configured to receive data from the sensor 119, store the data from the sensor 119, and/or provide (e.g., transmit) the data, from the sensor 119 to the remote device 110.

Figure 3:
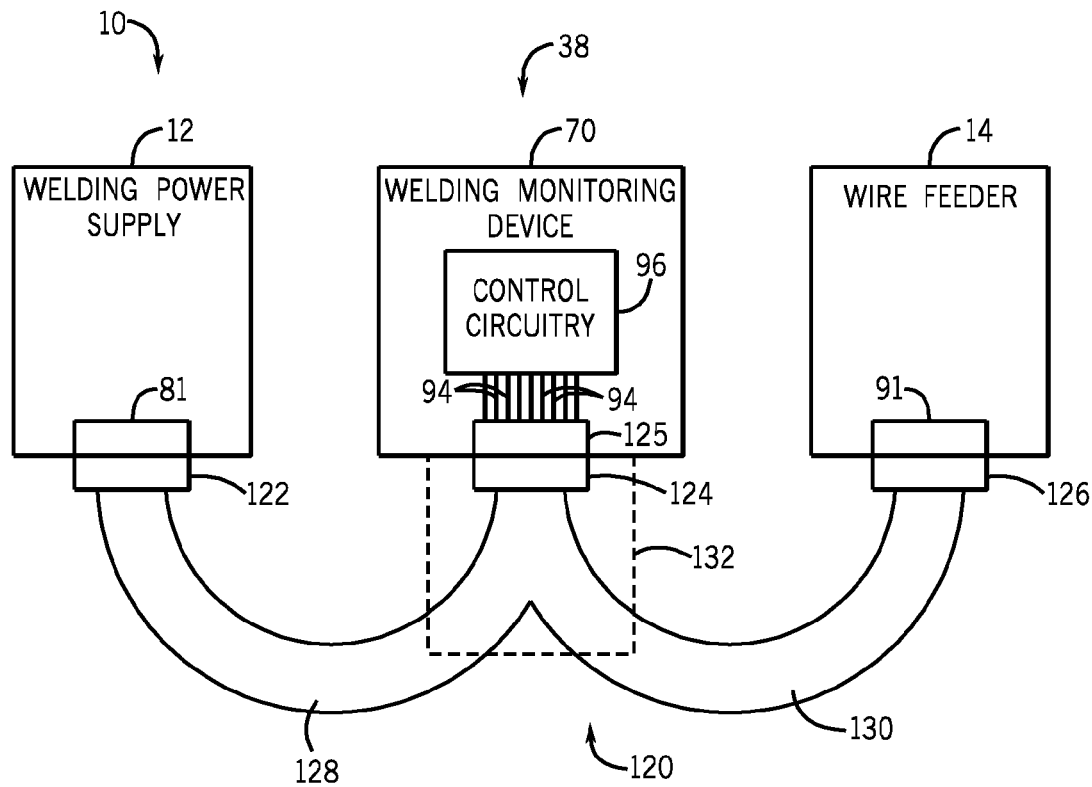
FIG. 3 is a block diagram of an embodiment of a low cost monitoring system for detecting welding parameters employing a single cable assembly coupled to a welding monitoring device in accordance with aspects of the present disclosure.

FIG. 3 is a block diagram of an embodiment of the low cost monitoring system 38 for detecting welding parameters employing a single cable assembly 120 coupled to the welding monitoring device 70 (e.g., in place of multiple cable assemblies). Specifically, the cable assembly 120 includes a first connector 122 coupled to the connector 81 of the welding power supply 12, a second connector 124 coupled to a connector 125 of the welding monitoring device 70, and a third connector 126 coupled to the connector 91 of the wire feeder 14. The connectors 122, 124, and 126 are coupled together with a single cable having two cable branches 128 and 130. As illustrated, within a section 132 of the cable assembly 120, a single cable is connected to the second connector 124. The single cable branches so that the first cable branch 128 is connected to the first connector 122 and the second cable branch 130 is connected to the third connector 126. Accordingly, the signals being sent between the welding power supply 12 and the wire feeder 14 are tapped into within the section 132 so that the conductors 94 carry the signals to the control circuitry 96. Furthermore, the signals from the cable branches 128 and 130 are joined together within the section 132. For example, in certain embodiments, signal carrying conductors within the first cable branch 128 may be coupled to signal carrying conductors within the second cable branch 130 via the pins or sockets within the connector 124. It should be noted that the signals carried on the conductors 94 are not welding power.

Figure 4:
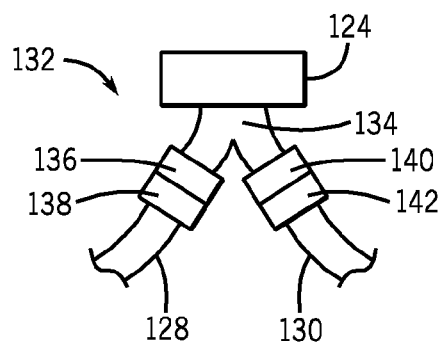
FIG. 4 is a block diagram of an embodiment of a splitter that may be employed with the cable assembly of FIG. 3 in accordance with aspects of the present disclosure.

FIG. 4 is a block diagram of an embodiment of a splitter 134 that may be employed with the cable assembly 120 of FIG. 3. The splitter 134 includes the second connector 124 that is coupled to the welding monitoring device 70. The splitter 134 also includes a first branch connector 136 that couples with a connector 138. In the present embodiment, the connector 138 is attached to the first cable branch 128. The splitter 134 also includes a second branch connector 140 that couples with a connector 142. In the present embodiment, the connector 142 is attached to the second cable branch 130. Accordingly, the splitter 134 may be part of the cable assembly 120, and provides another way to connect the cable assembly 120 to the welding power supply 12, the welding monitoring device 70, and the wire feeder 14.

Figure 5:
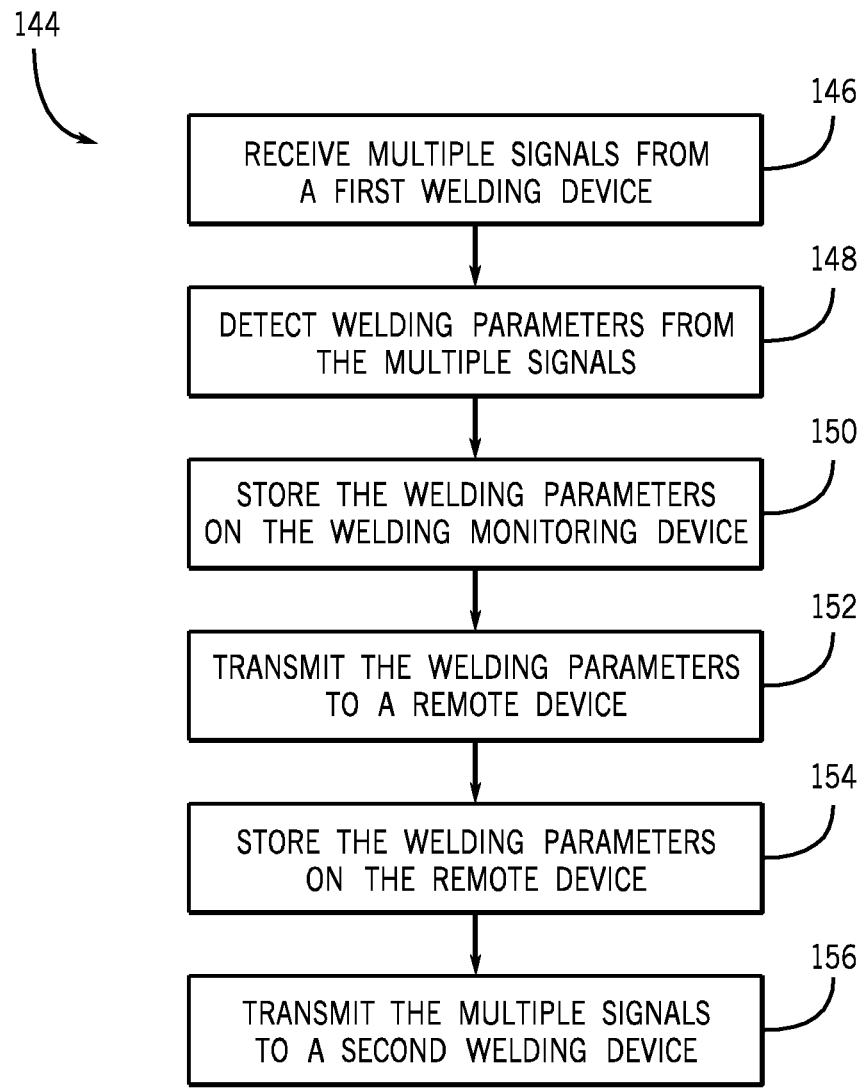
FIG. 5 is a flow chart of a method for detecting welding parameters in accordance with aspects of the present disclosure.

FIG. 5 is a flow chart of a method 144 for detecting welding parameters. At block 146, the welding monitoring device 70 may receive multiple signals from a first welding device (e.g., welding power supply 12, wire feeder 14, remote control device, etc.). As previously discussed, the multiple signals correspond to welding parameters, and none of the multiple signals carry welding power. The welding monitoring device 70 detects welding parameters from the multiple signals (block 148). The welding parameters may include voltages, currents, sensor data, etc. In certain embodiments, the detected welding parameters may be stored on or by the welding monitoring device 70 (block 150).

At block 152, the welding monitoring device 70 provides (e.g., transmits) the detected welding parameters to the remote device 110. The remote device 110 may be any type of computing device, or another suitable device. The remote device 110 may receive the detected welding parameters from the welding monitoring device 70 either through a wired or wireless connection. In certain embodiments, the detected welding parameters may be stored on the remote device 110 (block 154). Furthermore, in certain embodiments, the remote device 110 may be configured to provide data to the welding monitoring device 70. At block 156, the welding monitoring device 70 provides (e.g., transmits) the multiple signals to a second welding device (e.g., welding power supply 12, wire feeder 14, etc.). Accordingly, the signals are provided from the first welding device to the second device, and the signals are tapped into so that welding parameters may be detected from the signals.

Using the techniques described herein, a low cost welding monitoring system 38 may be integrated into a welding system 10. The monitoring system 38 may be easily installed, and may be beneficial to operators of the welding system 10. For example, the monitoring system 38 may help improve welding quality, welding efficiency, welding techniques, and so forth. Furthermore, while certain embodiments include the low cost welding monitoring system 38 as part of a welding system, a similar low cost monitoring system may be incorporated into a cutting system, a heating system, or any suitable system.

While only certain features of the invention have been illustrated and described herein, many modifications and changes will occur to those skilled in the art. It is, therefore, to be understood that the appended claims are intended to cover all such modifications and changes as fall within the true spurt of the invention.

The invention claimed is:

1. A system for detecting welding parameters, plasma cutting parameters, or carbon arc gouging parameters, comprising:
an input terminal configured to receive a plurality of signals corresponding to welding parameters, plasma cutting parameters, or carbon arc gouging parameters from a first welding device of a welding system, a first plasma cutting device of a plasma cutting system, or a first carbon arc gouging device of a carbon arc gouging system, wherein none of the plurality of signals carry welding power, plasma cutting power, or carbon arc gouging power;
an output terminal configured to provide the plurality of signals to a second welding system of the welding system, a second plasma cutting device of the plasma cutting system, or a second carbon arc gouging device of the carbon arc gouging system;
a first plurality of conductors coupled between the input terminal and the output terminal and configured to carry the plurality of signals between the input terminal and the output terminal;
a second plurality of conductors, each conductor of the second plurality of conductors coupled to a respective conductor of the first plurality of conductors; and
control circuitry coupled to the second plurality of conductors and configured to detect the welding parameters, plasma cutting parameters, or carbon arc gouging parameters from the plurality of signals via the second plurality of conductors.

2. The system of claim 1, wherein the control circuitry is configured to store the detected welding parameters, plasma cutting parameters, or carbon arc gouging parameters.

3. The system of claim 1, wherein the control circuitry is configured to provide the detected welding parameters, plasma cutting parameters, or carbon arc gouging parameters to a remote device.

4. The system of claim 1, wherein the control circuitry is configured to analyze the detected welding parameters, plasma cutting parameters, or carbon arc gouging parameters to generate data relating to a welding application, a plasma cutting application, or a carbon arc gouging application.

5. The system of claim 1, wherein the control circuitry is configured to modify at least one of the plurality of signals by issuing a command, interrupting a signal, adjusting a signal, or some combination thereof, based on the detected welding parameters, plasma cutting parameters, or carbon arc gouging parameters, or based on data received by the control circuitry.

6. The system of claim 1, wherein the control circuitry is configured to detect the welding parameters, the plasma cutting parameters, or the carbon arc gouging parameters from the plurality of signals via the second plurality of conductors without altering the plurality of signals.

7. The system of claim 1, wherein the plurality of signals are configured to power the control circuitry.

8. A method for detecting welding parameters, plasma cutting parameters, or carbon arc gouging parameters, comprising:
receiving, at an input terminal of a welding monitoring device, a plasma cutting monitoring device, or a carbon arc gouging monitoring device, a plurality of signals from a first welding device, a first plasma cutting device, or a first carbon arc gouging device, wherein the plurality of signals correspond to welding parameters, plasma cutting parameters, or carbon arc gouging parameters, and none of the plurality of signals carry welding power, plasma cutting power, or carbon arc gouging power;
detecting, via a plurality of detection conductors connected to control circuitry of the welding monitoring device, the plasma cutting monitoring device, or the carbon arc gouging monitoring device, the welding parameters, the plasma cutting parameters, or the carbon arc gouging parameters from the received plurality of signals; and
providing, at an output terminal of the welding monitoring device, the plasma cutting monitoring device, or the carbon arc gouging monitoring device, the received plurality of signals to a second welding device, a second plasma cutting device, or a second carbon arc gouging device;
wherein the plurality of detection conductors are connected to pass-through conductors coupled between the input terminal and the output terminal of the welding monitoring device, the plasma cutting monitoring device, or the carbon arc gouging monitoring device.

9. The method of claim 8, comprising providing the welding parameters from the welding monitoring device to a remote device, providing the plasma cutting parameters from the plasma cutting monitoring device to the remote device, or providing the carbon arc gouging parameters from the carbon arc gouging monitoring device to the remote device.

10. The method of claim 8, wherein receiving the plurality of signals from the first welding device comprises receiving the plurality of signals from a welding power supply, receiving the plurality of signals from the first plasma cutting device comprises receiving the plurality of signals from a plasma cutting power supply, or receiving the plurality of signals from the first carbon arc gouging device comprises receiving the plurality of signals from a carbon arc gouging power supply.

11. The method of claim 8, comprising storing the welding parameters on the welding monitoring device, storing the plasma cutting parameters on the plasma cutting monitoring device, or storing the carbon arc gouging parameters on the carbon arc gouging monitoring device.

12. The method of claim 8, comprising storing the welding parameters on a remote device, storing the plasma cutting parameters on the remote device, or storing the carbon arc gouging parameters on the remote device.

13. The method of claim 8, wherein providing the received plurality of signals to the second welding device comprises providing the received plurality of signals to a wire feeder.

14. A device for detecting welding parameters, plasma cutting parameters, or carbon arc gouging parameters, comprising:
   a first connector;
   a second connector;
   a first plurality of conductors coupled between the first connector and the second connector, wherein each conductor of the first plurality of conductors is configured to carry a signal between the first connector and the second connector, and none of the first plurality of conductors carry welding power, plasma cutting power, or carbon arc gouging power;
   a second plurality of conductors, each conductor of the second plurality of conductors coupled to a respective conductor of the first plurality of conductors; and
   control circuitry coupled to the second plurality of conductors and configured to detect welding parameters, plasma cutting parameters, or carbon arc gouging parameters from the first plurality of conductors via the second plurality of conductors.

15. The device of claim 14, comprising a battery coupled to the control circuitry and configured to power the control circuitry.

16. The device of claim 14, comprising a wireless transmitter coupled to the control circuitry and configured to provide the detected welding parameters, the plasma cutting parameters, or the carbon arc gouging parameters to a remote device.

17. The device of claim 14, comprising a communication port coupled to the control circuitry and configured to enable communication with a network.

18. The device of claim 14, wherein the first connector and the second connector each comprise a 14-pin connector.

19. The device of claim 14, comprising a universal serial bus port coupled to the control circuitry and configured to enable communication with an external storage device for storage of the detected welding parameters, the plasma cutting parameters, or the carbon arc gouging parameters.

20. The device of claim 14, wherein the control circuitry is configured to receive data from a sensor in a welding system, a plasma cutting system, or a carbon arc gouging system, and to provide the detected welding parameters, the plasma cutting parameters, or the carbon arc gouging parameters and the sensor data to a remote device.

\* \* \* \* \*